3,297,583
METHOD OF RAPID DISSOLUTION

Wolfgang Dierichs and Werner Sammet, both of Dusseldorf-Holthausen, Germany, assignors to Henkel & Cie. G.m.b.H., Dusseldorf-Holthausen, Germany, a corporation of Germany
No Drawing. Filed Feb. 18, 1964, Ser. No. 345,576
Claims priority, application Germany, Apr. 6, 1963, H 48,778
8 Claims. (Cl. 252—363.5)

The invention relates to a novel process for the rapid and lump-free dissolution in water of pretreated, water-soluble macromolecular substances containing a plurality of hydroxyl groups. The invention further relates to compositions of pretreated, water-soluble macromolecular substances and substances which dissolve slowly in water with alkaline reaction.

Many water-soluble macromolecular substances containing a plurality of hydroxyl groups tend to form lumps or agglomerates when added to water, particularly if they are in the form of fine powders. Therefore, dissolution of these substances in water has required slow dissolution with continuous stirring or after previous moistening but these measures require a substantial length of time. Agglomeration has been avoided by pretreating the macromolecular substances which contain a plurality of hydroxyl groups which are soluble in water or aqueous alkaline solutions with aldehydes as disclosed in Austrian Patent No. 199,616. This pretreatment, however, greatly reduces the rate of dissolution so the advantages thereof are offset by the prolonged time of dissolution.

It is an object of the invention to provide a novel process for the rapid and lump-free dissolution of pretreated water-soluble, macromolecular substances containing a plurality of hydroxyl groups.

It is another object of the invention to provide readily dissolvable compositions comprising pretreated water-soluble, macromolecular substances containing a plurality of hydroxyl groups and substances which dissolve slowly in water with alkaline reaction.

These and other objects and advantages of the invention will become obvious from the following detailed description.

The process of the invention for the rapid, lump-free dissolution of water-soluble macromolecular substances containing a plurality of hydroxyl groups pretreated with acidic aldehydes comprises contacting the said pretreated macromolecular substances with water and immediately adjusting the pH value to about 7 to 10 whereby the said pretreated macromolecular substances are rapidly dissolved in the water.

The water-soluble macromolecular substances containing a plurality of hydroxyl groups are well known to those skilled in the art. Examples of said substances are cellulose substances such as methylcellulose, oxethylcellulose, methyloxethylcellulose, ethyloxethylcellulose, carboxymethylcellulose, carboxyethylcellulose, methylcarboxymethylcellulose, ethylcarboxymethylcellulose, oxyethylcarboxymethylcellulose, sulfomethylcellulose, etc.; starch substances such as swelling starch, dextrin, methyl starch, carboxymethyl starch, etc.; plant extracts such as pectin, carragheen, tragacanth, carob bean flour, guarana flour, etc.; and synthetic substances such as polyvinyl alcohol and its water soluble derivatives.

The pretreatment of the said water-soluble macromolecular substances containing a plurality of hydroxyl groups to prevent lumping is described in Austrian Patent No. 199,616 and comprises treating the said macromolecular substances in the dry state with 0.005 to 5% of an aldehyde or dialdehyde in the presence of a weak acid such as formic acid. Solutions of macromolecular substances treated in this way are weakly acidic. For instance, 2% solution of a methylcellulose treated with glyoxal has a pH value of 5.5.

The said aldehydes may be aliphatic aldehydes such as formaldehyde, acetaldehyde, isobutyraldehyde, etc.; or aliphtic dialdehydes such as glyoxal, malonaldehyde, succinaldehyde, glutaraldehyde, adipinaldehyde, octandialdehyde, etc. Formaldehydes and glyoxal are preferred.

The contacting of the pretreated water-soluble macromolecular substances having a plurality of hydroxyl groups with water may be effected at room temperatures by sprinkling the said substances into water with stirring, pouring water over the substances with stirring or by dampening the substances with water. Immediately after the said substances have been thoroughly contacted with the water, a sufficient amount of an alkaline substance is added thereto with gentle stirring to adjust the pH to between 7 to 10, preferably 7.5 to 9. A higher pH is usually undesirable for practical reasons.

By changing the pH value, the rate of dissolution is increased by about 10 to 120 times the usual rate of the said pretreated water-soluble macromolecular substances and the dissolution is so rapid that undissolved particles scarcely sink because of the rapid increase in the viscosity of the solution and further stirring becomes unnecessary.

If the water to be used for the dissolution of the said substances is made alkaline before the addition of the said substances, lumps form in the same fashion as if the substances had not been pretreated with aldehydes and the rate of dissolution is substantially reduced by this lump or agglomeration formation.

The alkaline substances may be any compound which dissolves in water with an alkaline pH value. Examples of suitable alkaline compounds are alkali metal hydroxides and carbonates such as sodium hydroxide, potassium hydroxide, sodium carbonate, potassium carbonate, etc.; alkaline earth metal compounds such as calcium hydroxide, milk of lime, barium hydroxide, etc.; borax, alkali metal phosphates, amines, ammonia, alkali metal salts of carboxylic acids such as sodium formate, potassium acetate, sodium benzoate, etc.

A special embodiment of the invention comprises rapidly dissolvable compositions comprising water-soluble macromolecular substances containing a plurality of hydroxyl groups pretreated with aldehydes and substances which dissolve slowly in water with an alkaline reaction. Examples of suitable substances are alkaline earth metal carbonates and sulfates such as calcium carbonate, barium carbonate and calcium sulfate (satin white) and relatively slowly soluble, alkaline reacting swelling starch. However, these compositions must be thoroughly moistened before the water of dissolution becomes alkaline by the dissolution of the alkaline dissolving substances.

The ratio of the macromolecular substance to the alkaline water soluble substances should be such that the pH of the final aqueous solution is between 7 and 10, preferably, 7.5 to 9. Therefore, the said ratio depends upon the degree of ionization of the alkaline water soluble substance. The lower the degree of ionization of the said substance, the more of the alkaline water soluble substance may be present in the composition.

The aqueous solutions of the macromolecular substances containing a plurality of hydroxyl groups are useful as additives, for thickening aqueous dispersions and pastes and as binding agents for paints.

In the following examples there are described several performed embodiments to illustrate the invention. However, it should be understood that the invention is not intended to be limited to the specific embodiments.

*Example I*

100 gm. of methylcellulose having a viscosity of 3800 cps. (Brookfield) in 2% aqueous solution and a grain size of less than 160 m$\mu$ were sprayed in a mixing vessel with a solution consisting of 3.3 gm. of 30% glyoxal, 0.4 gm. of 98% formic acid and 3 gm. of water. Then the moistened mixture was admixed and heated for one and a half hours at 60° C. in a drying chamber to obtain a powder which did not differ in appearance and grain size from the starting methylcellulose. The powder could be dispersed without the formation of agglomerates by sprinkling it on water but it required five hours to completely dissolve the powder. The final solution had a pH of about 5.5 and the 2% solution had a viscosity of 3000 cps.

Immediately after dispersing 4 gm. of the powdered methylcellulose treated with glyoxal in 200 cc. of water by stirring, the pH value is brought to 7.5 by the addition of ammonia. All the powder had completely dissolved after only seven minutes and the solution had a viscosity of 3000 cps. (Brookfield). The process was repeated except that the pH value was immediately raised to 9 by the ammonia addition and all the said powder had completely dissolved at the end of only two minutes to give a 2% solution having a viscosity of 2900 cps. (Brookfield).

*Example II*

100 kgm. of methylcellulose having a viscosity of 300 cps. in 2% solution (Brookfield) and a degree of reaction of 1.6 and a grain size of less than 125 m$\mu$ were sprayed in a rapidly rotating mixer within a period of 15 minutes with a solution consisting of 3.3 kgm. of 30% glyoxal, 0.4 kgm. of 98% formic acid and 3 kgm. of water. Then the mixture was mixed for an additional ten minutes after which the material was allowed to stand for ten hours in a closed vessel, during which its temperature rose to about 45° C. A dust-fine powder was obtained which did not differ in outward appearance from the starting methylcellulose. The product could be dispersed lump-free in water but 4.5 hours were required to completely dissolve the powder to form a 2% solution having a pH of 5.5.

Immediately after dispersing 4 gm. of the powdered methylcellulose treated with glyoxal in 200 cc. of water by stirring, the pH value was adjusted to 7.2 with dilute ammonia. Complete dissolution of all the powdered pretreated methylcellulose occurred in six minutes to obtain a 2% solution having a viscosity of 300 cps. The process was repeated except that the pH value was immediately adjusted to 8 by the addition of anhydrous sodium carbonate. The powder had completely dissolved in five minutes to give a 2% solution having a viscosity of 300 cps.

*Example III*

3 gm. of the methylcellulose pretreated with glyoxal according to Example II were uniformly admixed with 100 gm. of technical grade calcium carbonate. 120 cc. of water were poured over the mixture, and after it was completely wetted it was thoroughly stirred. The pH value adjusted itself to 7.5 within 20 minutes. A homogenous, satisfactorily spreadable mixture was obtained.

80 gm. of the same methylcellulose pretreated with glyoxal were admixed in the dry state with 20 gm. of an alkaline reacting swelling starch (pH value of a 5% aqueous solution is 9.3). 4 gm. of the mixture of methylcellulose and swelling starch were dispersed in 200 cc. of water by simple stirring. After three minutes, the pH value of the mixture was 7.2 and the complete dissolution time (the time between stirring the mixture into the water and the occurrence of the final viscosity) was 30 minutes.

*Example IV*

100 gm. of carboxymethylcellulose having a viscosity of 4000 cps. (Brookfield) in 2% aqueous solution and a degree of reaction of 0.8 and a grain size of less than 90 m$\mu$ were treated with the glyoxal solution used in Example I, and after ten minutes of mixing, the mass was stored for one and a half hours in a drying chamber at 60° C. A finely powdered product was obtained which could be dissolved lump-free in water having a pH value of 6 but the dissolution time was one hour to obtain a 2% solution having a viscosity of 4000 cps.

Immediately after 4 gm. of the same pretreated carboxymethylcellulose were dispersed in 200 cc. of water by simple stirring, the pH value was brought to 7 by addition of anhydrous sodium carbonate. In this instance the time between dispersion of the carboxymethylcellulose and its dissolution to obtain a 2% solution having a viscosity of 400 cps. (Brookfield) was three minutes.

*Example V*

100 gm. of a neutral reacting swelling starch prepared by glutanization of potato starch and having a viscosity of 1000 cps. (Brookfield) in 5% solution were sprayed with the acid glyoxal solution used in Example I. After ten minutes of mixing, the mass was stirred for one and a half hours in a drying chamber at 60° C. to obtain a finely powdered product which did not differ in outward appearance from the originally used swelling starch. Dissolution time to prepare a 5% solution of the powder was four hours and the pH value of the said solution was 5.3.

Immediately after 10 gm. of the same pretreated swelling starch were dispersed in 200 cc. of water by simple stirring, the pH value was adjusted to 8 with dilute ammonia. The dissolution time to obtain a 5% solution having a viscosity of 1000 cps. was five minutes.

*Example VI*

100 gm. of cold water-soluble guarana flour with a viscosity of 10,000 cps. (Brookfield) in 2% solution and a grain size of less than 160 m$\mu$ were sprayed with the acid glyoxal solution described in Example I, and after ten minutes of mixing, the mass was stirred for one and a half hours at 60° C. in a drying chamber. The finely powdered product obtained did not outwardly differ from the originally used guarana flour. The pH value of a 2% solution of the powder was 5.5, and the dissolution time required was five hours.

Immediately after 4 gm. of the said pretreated guarana flour were dispersed in 200 cc. of water by simple stirring, the pH was adjusted to 8 by addition of trisodium phosphate. The dissolution time to obtain a 2% solution having a final viscosity of 10,000 cps. was 30 minutes.

Various modifications of the process of the invention may be made without departing from the spirit or scope thereof and it is to be understood that the invention is to be limited only as defined in the appended claims.

We claim:

1. A process for the rapid, lump-free dissolution of a water-soluble macromolecular substance having a plurality of hydroxyl groups selected from the group consisting of cellulose substances, starch substances, plant extracts and polyvinyl alcohol which substances have been pretreated in the dry state with 0.005 to 5% of an aldehyde selected from the group consisting of lower alkyl aldehydes and lower alkyl dialdehydes in the presence of a weak acid which comprises dispersing the said pretreated macromolecular substance having a plurality of hydroxy groups in water and immediately thereafter adding a sufficient amount of an alkaline acting substance thereto to adjust the pH value to 7 to 10 whereby the said macromolecular substance rapidly dissolves in the water.

2. The process of claim 1 wherein the pH is adjusted to 7.5 to 9.

3. The process of claim 1 wherein the said macromolecular substance is a cellulose derivative.

4. The process of claim 1 wherein the said macromolecular substance is a starch.

5. The process of claim 1 wherein the said macromolecular substance is a plant extract.

6. The process of claim 1 wherein the aldehyde used for the pretreatment is selected from the group consisting of formaldehyde and glyoxal.

7. A composition rapidly soluble in water consisting essentially of a water-soluble mcaromolecular substance having a plurality of hydroxyl groups selected from the group consisting of cellulose substances, starch substances, plant extracts and polyvinyl alcohol which substances have been pretreated in the dry state with 0.005 to 5% of an aldehyde selected from the group consisting of lower alkyl aldehydes and lower alkyl dialdehydes in the presence of a weak acid and alkaline substances selected from the group consisting of alkaline earth metal carbonates and sulfates obtain a pH of 7 to 10 when the composition is added to water.

8. The composition of claim 7 wherein the aldehyde is selected from the group consisting of formaldehyde and glyoxal.

References Cited by the Examiner

UNITED STATES PATENTS 2,807,591  9/1957  Henry _____ 252—363.5

FOREIGN PATENTS 199,616  9/1958  Austria.

SAMUEL H. BLECH, *Primary Examiner.*

JULIUS GREENWALD, *Examiner.*

S. E. DARDEN, *Assistant Examiner.*